United States Patent [19]
Ozbutun et al.

[11] Patent Number: 5,963,935
[45] Date of Patent: Oct. 5, 1999

[54] COMBINING BITMAPS WITHIN A MEMORY LIMIT

[75] Inventors: Cetin Ozbutun, San Carlos; Jeffrey I. Cohen, Sunnyvale; Michael Depledge, San Jose; Julian Hyde; Hakan Jakobsson, both of San Francisco; Mark Kremer, Sunnyvale; Quoc Tai Tran, Redwood Shores, all of Calif.

[73] Assignee: Oracle Corporation, Redwood Shores, Calif.

[21] Appl. No.: 08/808,586

[22] Filed: Feb. 28, 1997

[51] Int. Cl.$^6$ .................................................. G06F 17/30
[52] U.S. Cl. ..................................... 707/3; 707/2; 707/10
[58] Field of Search ....................................... 707/2, 3, 10

[56] References Cited

U.S. PATENT DOCUMENTS

| | | | |
|---|---|---|---|
| 5,404,411 | 4/1995 | Banton et al. | 382/254 |
| 5,425,137 | 6/1995 | Mohan et al. | 345/433 |
| 5,495,608 | 2/1996 | Antoshenkov | 707/3 |
| 5,502,804 | 3/1996 | Butterfield et al. | 707/502 |
| 5,519,855 | 5/1996 | Neeman et al. | 707/3 |
| 5,604,850 | 2/1997 | Whitmer | 345/435 |
| 5,634,088 | 5/1997 | Banton | 395/102 |
| 5,642,473 | 6/1997 | Klotz, Jr. | 395/117 |
| 5,649,181 | 7/1997 | French et al. | 707/3 |
| 5,706,495 | 1/1998 | Chadha et al. | 707/2 |
| 5,710,915 | 1/1998 | McElhiney | 707/3 |
| 5,715,382 | 2/1998 | Herregods et al. | 395/117 |
| 5,729,735 | 3/1998 | Meyering | 707/10 |
| 5,751,921 | 5/1998 | Fujimoto | 395/109 |

OTHER PUBLICATIONS

"Oracle 7.3 Focuses on Data Warehousing", Dan Richman, Computerworld, Inc., Sep. 25, 1995.

"IOUW Wrap–Up; Vendors Introduce Database Tools at International Oracle Users Week Conference; Client/Server Connection; Industry Trend or Event", ASAP, vol. 8, No. 13, p. 112, ISSN: 1041–5173, Dec., 1995.

"Multi–Table Joins Through Bitmapped Join Indices", Patrick O'Neil, Goetz Graefe, Microsoft Corp., SIGMOD Record, vol. 24, No. 3, Sep. 1995.

"Model 204 Architecture and Performance", Presented at $2^{nd}$ International Workshop on High Performance Transaction Systems, Patrick O'Neil, Sep. 1987.

"Faster Data Warehouses", Infoweek, Sec. "OpenLabs", Issue: 556, Herb Edelstein, Dec. 4, 1995.

(List continued on next page.)

*Primary Examiner*—Paul R. Lintz
*Assistant Examiner*—Shahid Alam
*Attorney, Agent, or Firm*—McDermott, Will & Emery

[57] ABSTRACT

A method for combining within memory a limit, a plurality of bitmap streams from bitmaps of indefinite size and number. The bitmap streams are merged into a resulting bitmap which can be used in subsequent logical operations.

In order to perform a merge within a memory limit, the method relies on the data compression. When compression by itself may be ineffective, the method produces a resulting bitmap for a reduced range.

The ensures the production of a resulting bitmap. When the range is reduced, the method may be repeated to produce a merge for a range beyond the reduced range.

21 Claims, 8 Drawing Sheets

OTHER PUBLICATIONS

Ringtree: A VLSI Architecture For Fast Image Generation and Processing, K. S. Eo et al. ISACS' 88, Aug. 1988.

The i750 Video Processor: A Total Multimedia Solution, Kevin Harney et al. Communications oF The ACM, Apr. 1991.

Something Lossed, Something Gained Image Compression For PC Graphics, Lori Grunin, PC Magazine V11–No. 8, Apr. 1992.

Multispectral Image Compression Algorithms, Tassos Markas et al., 1993 IEEE, Jan. 1993.

RMTP: A Reliable Milticast Transport Protocol, John Lin et al., 1996 IEEE, Nov. 1996.

Level Compression–Based Image Representation And Its Applications, Kuo–Liang Chung et al., Patern Recognition, vol. 31, No. 3, Mar. 1998.

Star Queries in Oracle8, An Oracle Technical White Paper, pp. 1–16, Jun. 1997.

"Dynamic Optimization of Index Scans Restricted by Booleans," Gennady Antoshenkov, *ICDE* 1996: 430–440.

"Order Preserving String Compression," Gennady Antoshenkov, *David B. Lomet, James Murray, ICDE* 1996: 655–663.

"Dyanamic Query Optimization in Rdb/VMS," Gennady Antoshenkov, *ICDE* 1993: 538–547.

"Query Processing in DEC Rdb: Major Issues and Future Challenges," Gennady Antoshenkov, *Data Engineering Bulletin* 16(4): 42–52 (1993).

"Random Sampling from Psuedo–Ranked B+ Trees," Gennady Antoshenkov, *VLDB* 1992: 375–382.

"Oracle TextServer3 Concepts, Version 3," Oracle Corporation (Part No. A24984–1, 1995, pp. 3–1 to 3–23).

"Oracle Textserver3 Concepts, Release 3.1," Oracle Corporation (Part No. A41697–2), 1996, pp. 3–1 to 3–29.

TABLE 200

| Row ID | Name | Age |
|---|---|---|
| 1 | LINDA | 32 |
| 2 | BERT | 32 |
| 3 | JACK | 25 |
| 4 | EDDY | 39 |
| ... | ... | ... |
| 1000 | GREG | 39 |
| 1001 | MIKE | 62 |
| 1002 | ALICE | 25 |
| ... | ... | ... |
| 999,998 | FRED | 39 |
| 999,999 | PETER | 25 |
| 1,000,000 | RUSS | 39 |

COMBINING BITMAPS WITHIN A MEMORY LIMIT

The present application is related to U.S. patent application Ser. No. 08/807,344, entitled "CREATING BITMAPS FROM MULTI-LEVEL IDENTIFIERS" now pending, filed by Cetin Ozbutun, Michael Depeldge, Haken Jakobsson, Mark Kremer, Jeffery I. Cohen, Quoc Tai Tran, and Alexander C. Ho on the equal day herewith, the contents of which are incorporated herein by reference.

U.S. patent application Ser. No. 08/808,584, entitled "BITMAP SEGMENTATION" now pending, Cetin Ozbutun, Jeffery I. Cohen, Haskan Jakobsson, Mark Kremer, Michael Depledge, Quoc Tai Tran, Alexander C. Ho, and Julian Hyde, on the equal day herewith, the contents of which are incorporated herein by reference.

U.S. patent application Ser. No. 08/752,128, entitled "METHOD AND APPARATUS FOR PROCESSING COUNT STATEMENTS IN A DATABASE SYSTEM" U.S. Pat. No. 5,819,256, filed by Cetin Ozbutun, Michael Depledge, Halan Jakobsson, and Jeffrey I. Cohen, on Nov. 20, 1996, the contents of which are incorporated herein by reference.

U.S. patent application Ser. No. 08/808,097, entitled "GROUP BY AND DISTINCT SORT ELIMINATION USING COST-BASED OPTIMIZATION" U.S. Pat. No. 5,822,748, filed by Jeffrey Ira Cohen, Cetin Ozbutun, Michael Depledge, and Hakan Jakobsson, on the equal day herewith, the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY" now pending, filed by Jeffrey Ira Cohen, Cetin Ozbutun, Hakan Jakobsson, and Michael Depledge, on the equal day herewith, the contents of which are incorporated herein by reference.

U.S. patent application Ser. No. 08/808,094, entitled "INDEX SELECTION FOR AN INDEX ACCESS PATH" now pending, filed by Hakan Jakobsson, Michael Depledge, Cetin Ozbutun, and Jeffrey I. Cohen, on the equal day herewith, the contents of which are incorporated herein by reference, U.S. patent application Ser. No. 08/807,429, entitled "QUERY PROCESSING USING COMPRESSED BITMAPS" now pending, filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

U.S. patent application Ser. No 08/807,451, entitled "BITMAPPED INDEXING WITH HIGH GRANULARITY LOCKING" now pending, filed by Michael Depledge, Jeffrey I. Cohen, Hakan Jakobsson, Mark Kremer, Cetin Ozbutun, Quoc Tai Tran, and Alexander C. Ho, on the equal day herewith, the contents of which are incorporated herein by reference.

U.S. patent application Ser. No. 08/808,585, entitled "UPDATING BITMAPPED INDEXES" now pending, filed by Michael Depledge, Hakan Jakobsson, Cetin Ozbutun, Jeffey I. Cohen, and Quoc Tai Tran, on the equal day herewith, the contents of which are incorporated herein by reference.

U.S. patent application Ser. No. 08/808,560, entitled "BITMAP INDEX COMPRESSION" now pending, filed by Jeffrey I. Cohen, Michael Depledge, Hakan Jakobsson, Mark Kremer, Cetin Ozbutin, and Quoc Tai Tran, on the equal day herewith, the contents of which are incorporated herein by reference.

FIELD OF THE INVENTION

The present invention relates to databases, and more particularly, to performing logical operations using bitmap indexes found in databases.

BACKGROUND OF THE INVENTION

Queries are used to retrieve sets of data that match certain criteria. For example, a query could be used to retrieve from a data base a set of data for every person born in California AND living in California.

A bitmap index provides an efficient and fast means of retrieving data from a database. A bitmap index is an index that includes a set of bitmaps that can be used to access data. In the context of bitmap indexes, a bitmap is a series of bits that indicate which of the records stored in the body of data satisfy a particular criteria. Each record in the body of data has a corresponding bit in the bitmap. Each bit in the bitmap serves as a flag to indicate whether the record that corresponds to the bit satisfies the criteria associated with the bitmap.

Typically, the criteria associated with a bitmap is whether the corresponding records contain a particular key value. In the bitmap for a given key value, all records that contain the key value will have their corresponding bits set to 1 while all other bits are set to 0. A collection of bitmaps for the key values that occur in the data records can be used to index the data records. In order to retrieve the data records with a given key value, the bitmap for that key value is retrieved from the index and, for each bit set to 1 in the bitmap, the corresponding data record is retrieved. The records that correspond to bits are located based on a mapping function between bit positions and data records.

Figure 2A:
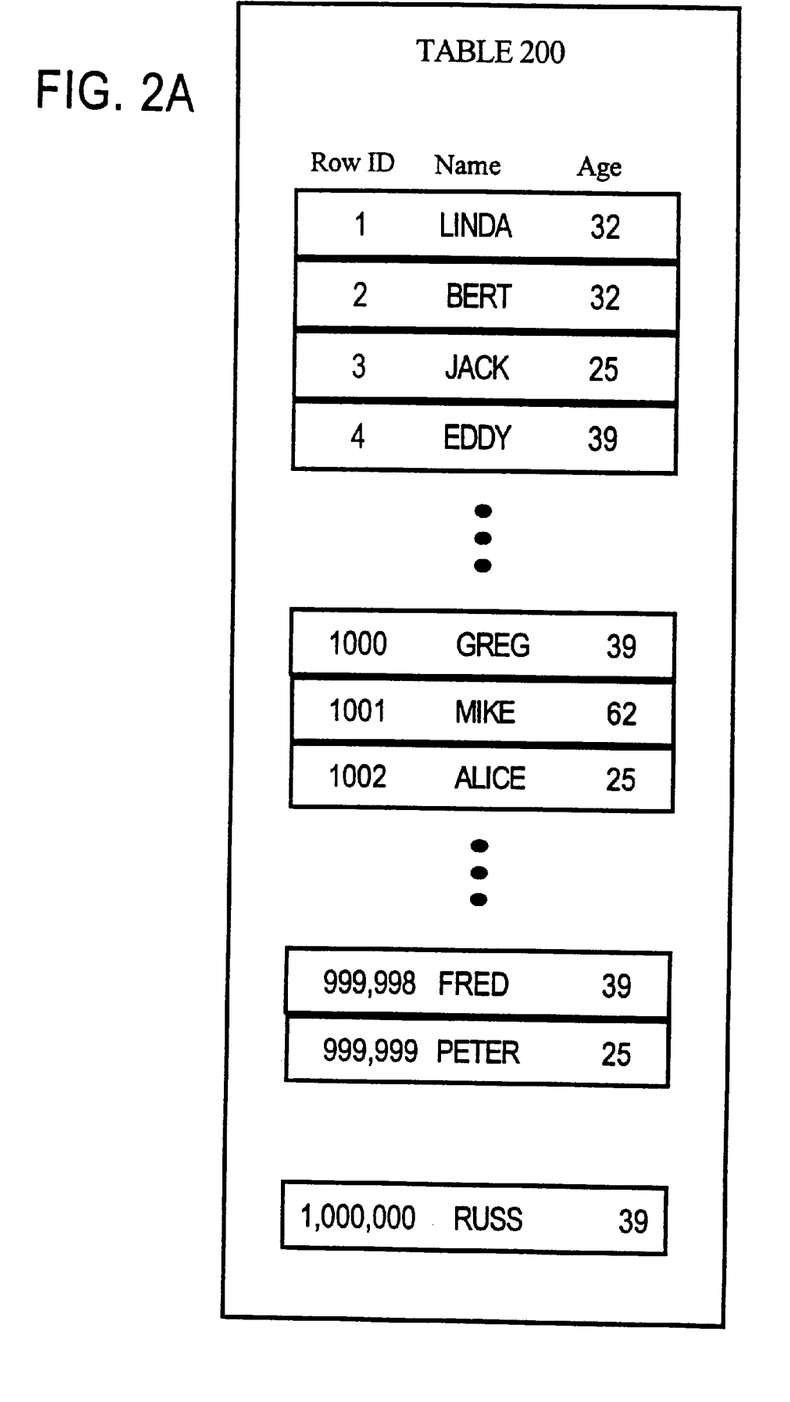
FIG. 2A shows an exemplary relational table.

To retrieve records matching criteria that can be represented by multiple key values, bitmaps can be combined using logical operations into a resulting bitmap. The resulting bitmap is used to retrieve the data. For example, FIG. 2A illustrates a Table 200 that contains 8,000,000 rows. Every row contains a name and an age. Retrieving a set of data for the condition age greater or equal to 25 can be performed by generating a resulting bitmap that represents the combining of the bitmaps with key values that match the condition.

Figure 2B:
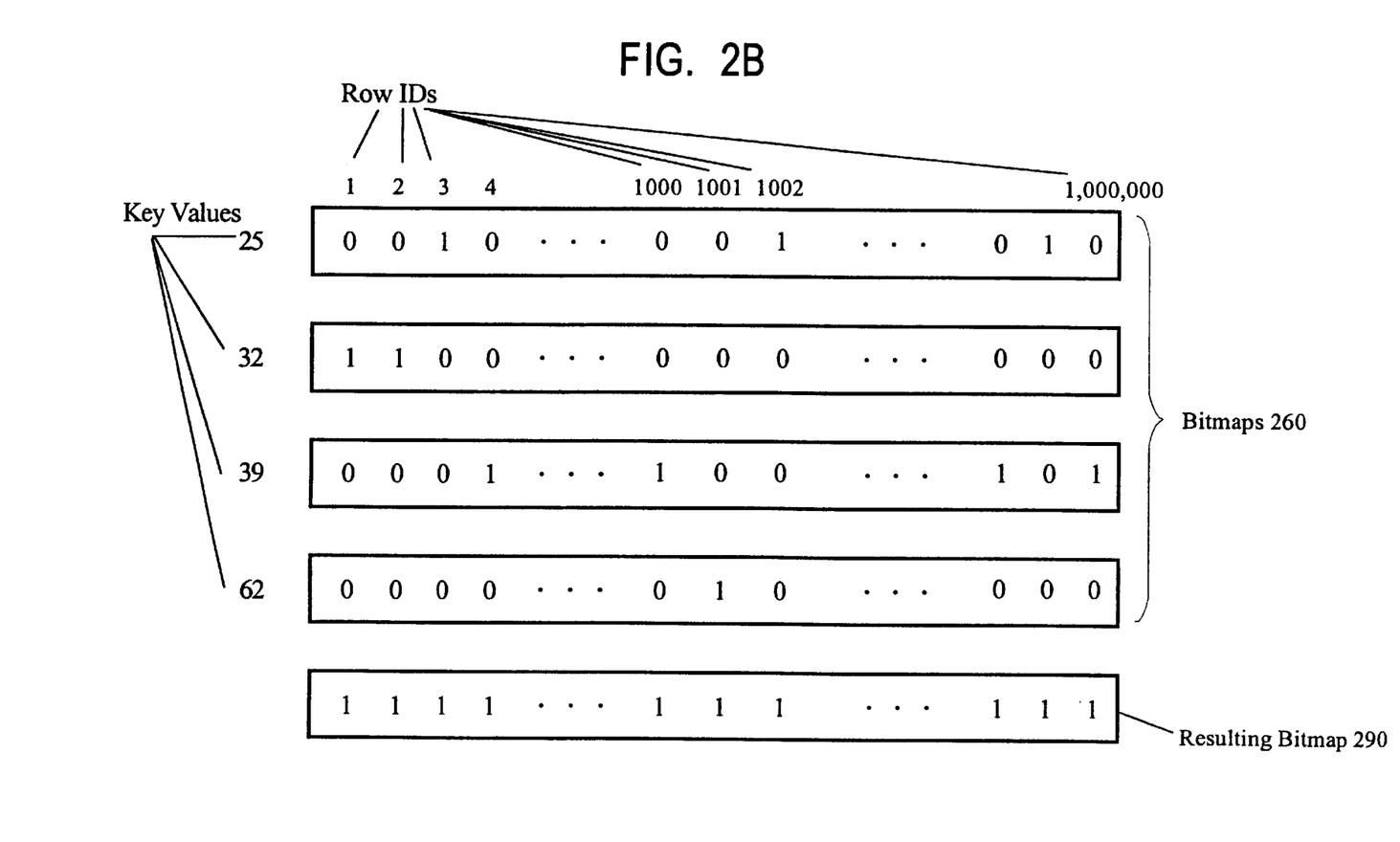
FIG. 2B shows bitmaps in a bitmap index.

FIG. 2B illustrates the combining of bitmaps that match the condition age greater than or equal to 25. Bitmaps 260 are some of the bitmaps matching this condition in a bitmap index of the age. The zeros and ones in bitmaps 260 are bits in bitmaps 260. According to one embodiment of the invention, each bitmap in bitmaps 260 is associated with a key value representative of an age. The position of the bits in bitmaps 260 correspond to the row ids of table 200 . These four bitmaps are combined using an OR operation to yield resulting bitmap 290. All bits shown in bitmap 290 are set to 1 because an OR operation is being performed and, among all bitmaps 266, there is bit set to one for each shown row.

While combining bitmaps to retrieve a set of data can be more efficient than other retrieval approaches, combining bitmaps can use undesirably large amounts of memory. For example, the bitmaps shown in FIG. 2B each represent a row in Table 200. Because each bitmap contains a bit for each row, any single bitmap could contain up to 8 million bits, or 1 million bytes (assuming 8 bit bytes).

Like any resource in a computer system, memory is limited. In a multi-process environment, numerous processes are concurrently competing for memory. To accommodate the competing demand for memory, memory limits are imposed upon processes. A process itself may self impose memory limits, the operating system may impose a memory limits upon the process, or some other mechanism may impose a memory limits.

The compression approach is one approach used to avoid exceeding memory limits when combining bitmaps. One way to compress bitmaps is to represent a sequence of bits set to 0 with a smaller sequence of bits containing a number. A sequence of bits set to 0 is referred to herein as a gap. The number contained in the smaller sequence of bits represents the number of bits set to zero in a gap. Compression can lessen the amount of memory needed to store a bitmap. The effectiveness of compression increases as the size of the gaps found in the bitmap increases.

A problem with the compression approach is that compression by itself can be ineffective for lessening the amount of memory needed for a bitmap like bitmap 290. Bitmap 290 has a bit set to 1 for every row meeting the condition age greater than or equal to 25. Assuming over half the rows contain an age greater than 25, over half the bits in bitmap 290 would be set to 1. Bitmaps with this many bits set to one inherently contain small gaps. Very little compression can be achieved, thus very little memory is saved.

Another problem with the compression approach involves large bitmaps. Some bitmaps may be so large that even when compression is effective, the memory required nevertheless exceeds the memory limit.

Based on the foregoing, it is clearly desirable to provide a method that combines bitmaps of indefinites size and number within a memory limit.

SUMMARY OF THE INVENTION

A method for combining within a memory limit, a plurality of bitmap streams from bitmaps of indefinite size and number. The bitmap streams are merged into a resulting bitmap which can be used in subsequent logical operations. A bitmap stream represents a flow of data from a bitmap in a database bitmap index.

In order to perform a merge within the memory limit, the method relies on the compression of interim data created and stored in the course of generating a resulting bitmap. When compression by itself may be ineffective, the method produces a resulting bitmap for a reduced range of row ids.

The method ensures the production of a resulting bitmap within a memory limit. When the range is reduced, steps of the method are repeated to produce a merge for a range beyond the reduced range of row ids.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for combining bitmaps within a memory limit is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
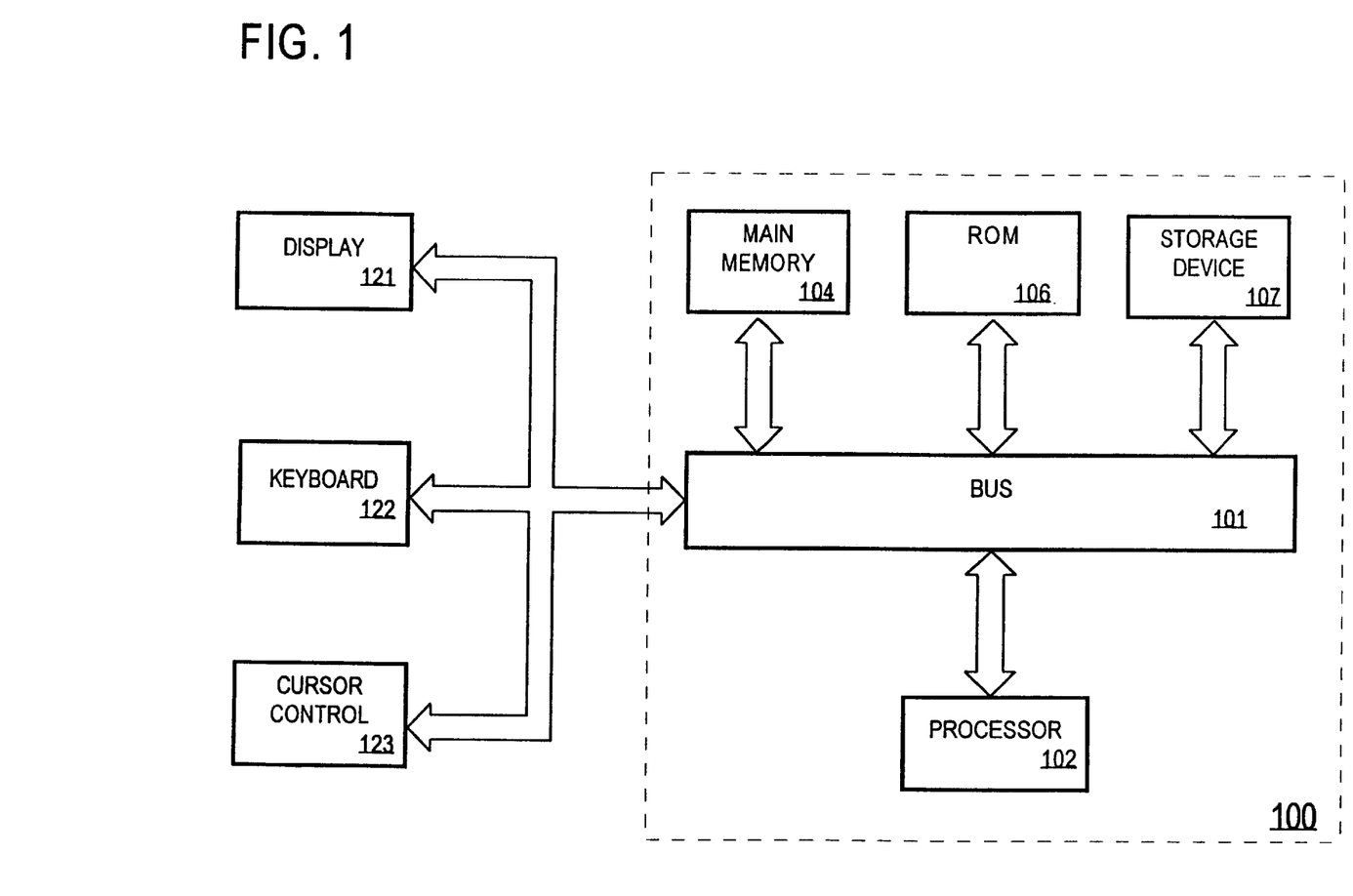
FIG. 1 is a block diagram of a computer system that may be used to implement an embodiment of the invention.

Referring to FIG. 1, it is a block diagram of a computer system 100 upon which one embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to combine a plurality of bitmaps. According to one embodiment, these operations are performed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

Figure 3:
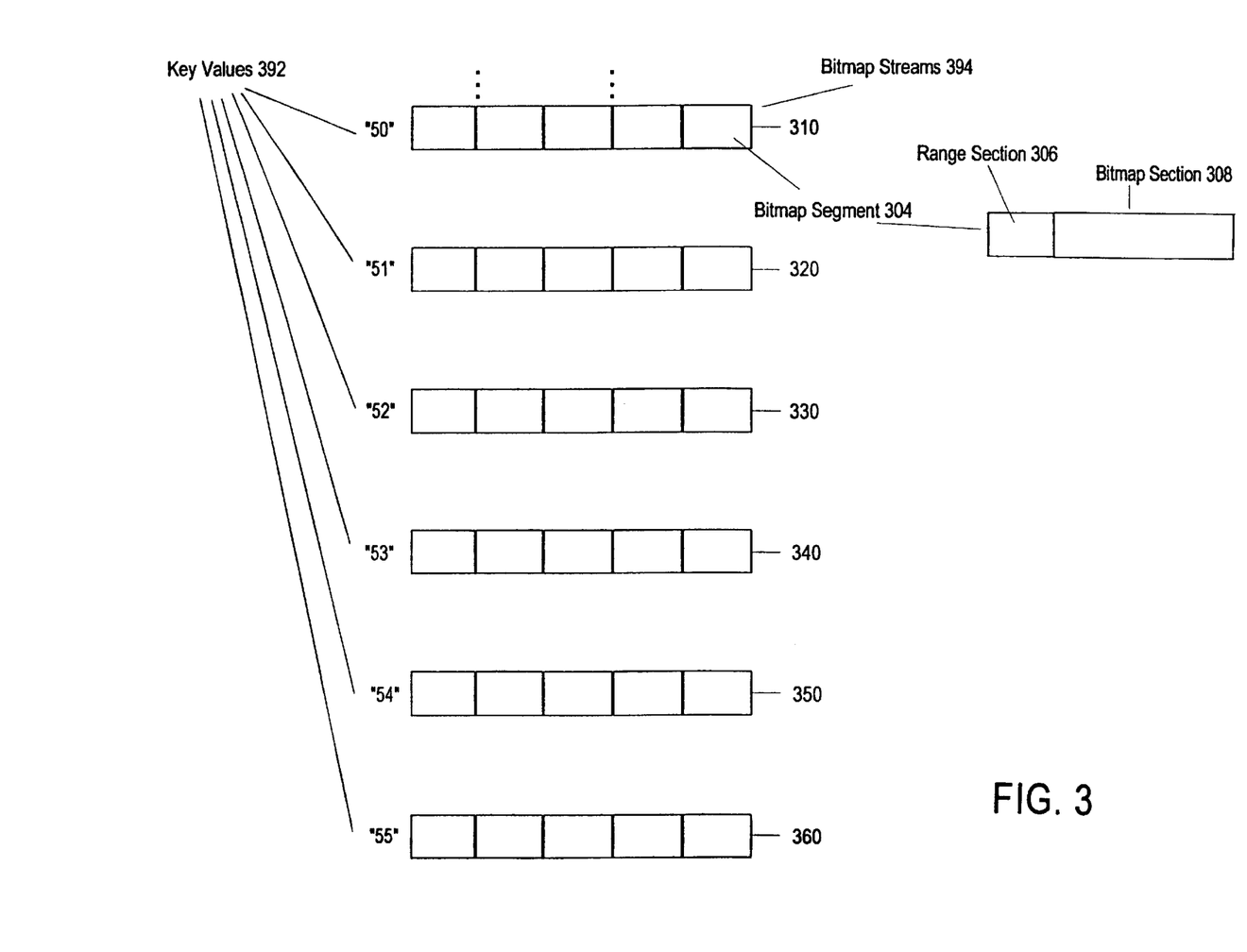
FIG. 3 shows bitmap streams and bitmap segments.

One embodiment of the invention combines a plurality of bitmaps merging them into a resulting bitmap. A merge represents the ORing of a plurality of bitmap streams. According to one embodiment of the invention, a bitmap stream represents a flow of data from a bitmap in a database bitmap index. A bitmap is composed of bitmap segments. Each bitmap segment is stored as a separated entity together with information of which range of records the bitmap segment covers. FIG. 3 shows an exemplary bitmap segment. Range section 306 of bitmap segment 304 contains information about which range of records bitmap segment 304 covers. Bitmap section 308 contains a portion of the bitmap corresponding to the range contained in range section 306. The bit position of a bit in bitmap section 308 corresponds to a row id within the range indicated by range section 306. In one embodiment of the invention, the portion of bitmap segment 304 containing the bitmap is compressed.

FIG. 3 shows exemplary bitmap stream 310, bitmap stream 320, bitmap stream 330, bitmap stream 340, bitmap stream 350, and bitmap stream 360. Each of the streams represents a flow of data from a bitmap in the bitmap index. Each of the streams are composed of bitmap segments like bitmap segment 304. Key values 392 are associated with each of the bitmap streams in plurality of bitmap streams 394.

In one embodiment of the invention, a plurality of bitmap streams are merged over a range of row ids to produce a resulting bitmap representing the ORing of a plurality of bitmap streams for the range. This resulting bitmap can be used in subsequent logical operations. An example of when the need for merge operation can arise is a query used to retrieve a set of data matching the condition key value$\geq$50. The plurality of bitmap streams 394 can be used to retrieve a set of data matching the condition key value=50, key value=51, key value=52, key value=53, key value=54, and key value=55. Merging the bitmap streams associated with all these values would produce a resulting bitmap representative of the condition.

A single bitmap index could contain a large number of bitmaps representing a equally large number of values. A condition like key value>value could encompass a large number of these values. Merging a large number of bitmap streams from the bitmaps associated with these values could require more memory than the memory limit imposed on a process performing the merge.

Initially, one embodiment of the invention attempts to merge the bitmap streams for a range encompassing the complete range of row ids associated with the bitmap segments in bitmap streams 394. In order to perform the merge within a memory limit, one embodiment of the invention relies on the compression of interim data created and stored in the course of generating a resulting bitmap. When compression by itself may be ineffective, one embodiment of the invention reduces the range of row ids over which the embodiment is merging in order to avoid exceeding the memory limit. Restricting the range of row ids reduces the amount of interim data that must be stored in memory before a resulting bitmap can be generated. After one embodiment of the invention produces a resulting bitmap for a reduced range of row ids, an embodiment may then proceed to produce a resulting bitmap for a range of row ids beyond the reduced range of ids.

One embodiment of the invention ensures the production of a resulting bitmap within a memory limit. The production of the resulting bitmap is assured even when the bitmap streams are from bitmaps of indefinite size and number.

EXEMPLARY MERGE PROCESS ON A COMPUTER SYSTEM

Figure 4:
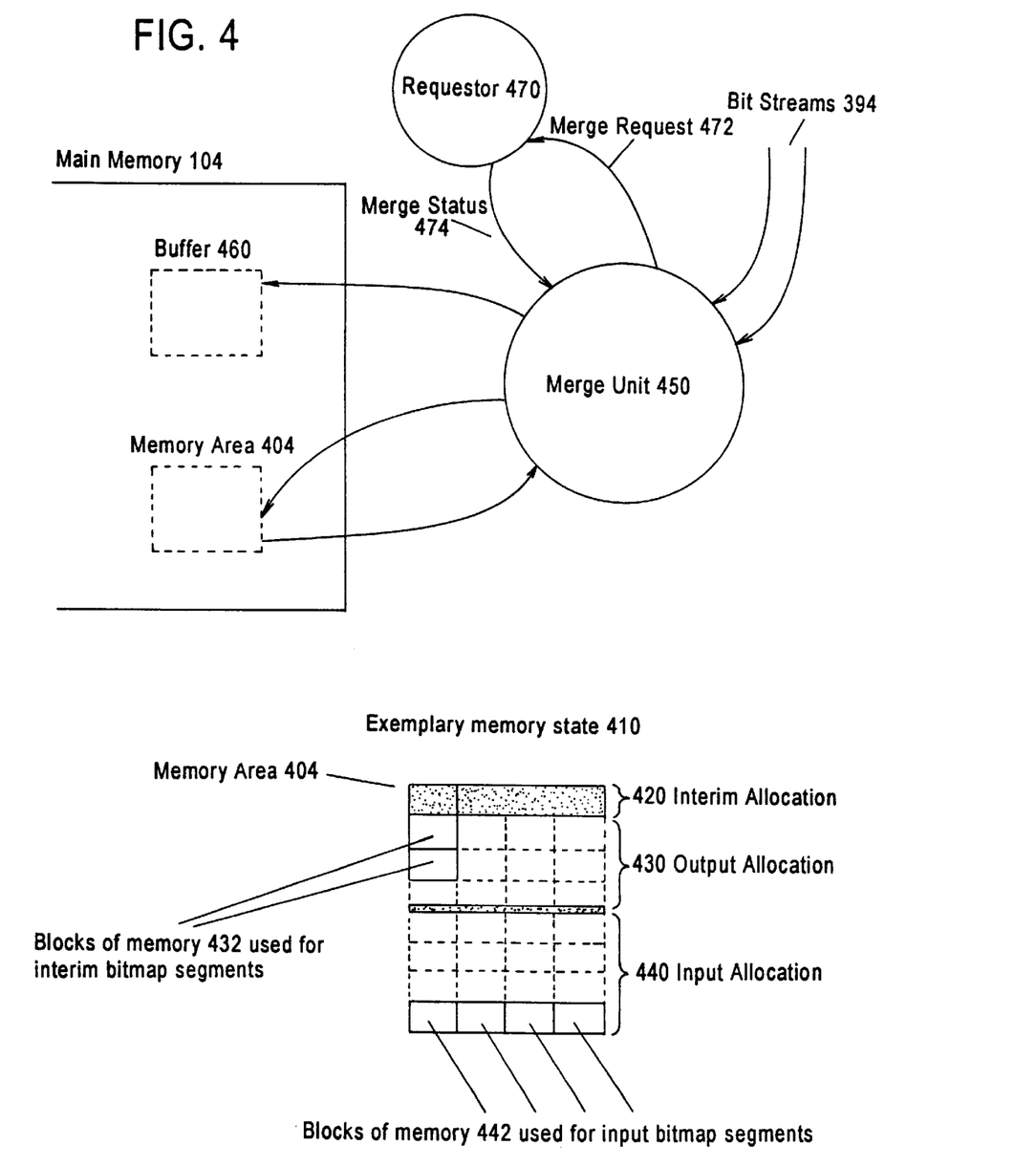

FIG. 4 shows an exemplary embodiment of the invention. Merge unit 450 is executing on computer system 100 in FIG. 1. Merge unit 450 receives a merge request 472 from requester 470 to merge bitmap streams 394. Merge unit 450 selects bitmap segments from bitmap streams 394 based on a range of row ids and stores them in memory area 404. According to one embodiment of the invention, merge unit 450 stores in buffer 460 a resulting bitmap representing the ORing of the selected bitmap segments for a range.

In one embodiment of the invention, merge unit 450 and requester 470 represent functions in a routine executing in computer system 100, where requester 470 calls merge unit 450. In alternate embodiments of the invention, merge unit 450 and requester 470 may represent objects which are instances of classes in an object oriented environment, where requester 470 invokes a method in merge unit 450. In other embodiments, merge unit 450 and requester 470 may be implemented in other combinations of functions, objects, procedures, or other like mechanisms.

Merge unit 450 then transmits merge status 474 to requester 470. Merge unit 450 initially attempts to merge bitmap stream 394 over a range initially set to encompass all row ids associated with the bitmap segments in bitmap streams 394. In one embodiment of the invention, merge status 474 indicates whether the resulting bitmap in buffer 460 represents a merge up to the last row id of the complete range of row ids range associated with the bitmap segments in bitmap streams 394. Requester 470 may then use the resulting bitmap in subsequent operations, such as logical ANDing. If requester 470 received a merge status indicating that the resulting buffer 460 does not represent a range which includes the last row id of the complete range of row ids associated with bitmap segments in bitmap streams 394, requester 470 may subsequently issue a merge request 472 for another resulting bitmap.

Memory area 404 represents an amount of memory which constitutes a memory limit. Memory area 404 is depicted as a contiguous area of memory for purposes of illustration only. Alternate embodiments of the invention use blocks of noncontiguous memory. The particular blocks of memory constituting the memory limit in an alternate embodiment could vary at different points of time in the execution of the steps of that embodiment.

DIVIDING THE MEMORY LIMIT

One embodiment of the invention divides the memory limit into three allocations. The first is the input allocation.

The input allocation is the portion of memory limit allotted to storing bitmap segments from bitmap streams 394. The bitmap segments are herein referred to as input bitmap segments. The second, the output allocation, is a portion of the memory limit used to store interim bitmap segments. The third, the interim allocation, is a portion of the memory limit allotted to storing interim bitmap segments generated in previous iterations in the performance of the steps of one embodiment of the invention. Initially, the memory limit is divided evenly between the input allocation and the output allocation, and the interim allocation is set to zero.

MERGING BITMAP STREAMS

Figure 5:
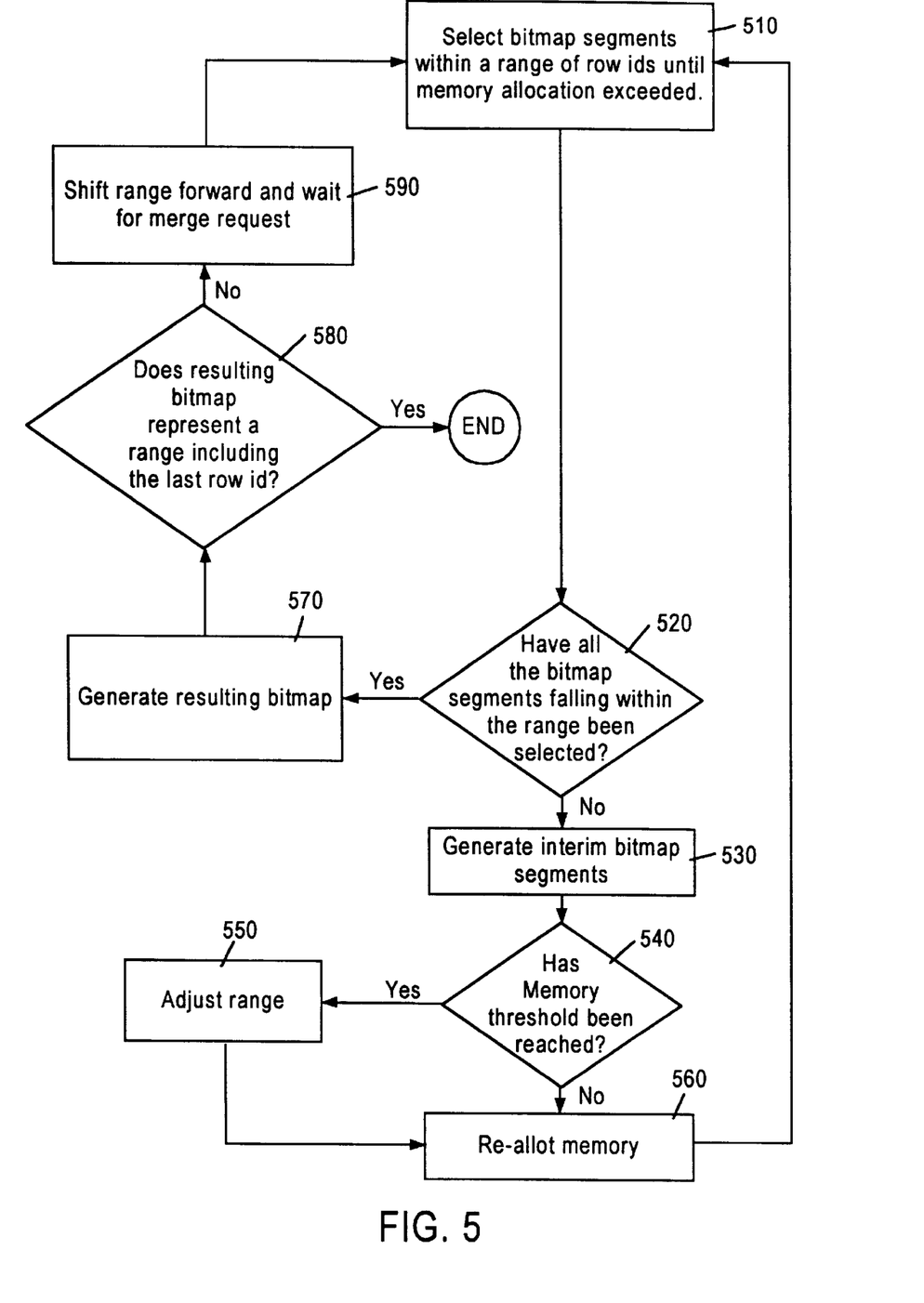
FIG. 5 depicts a flow of data into a merge unit performing a merge and shows an exemplary memory state depicting memory usage.

FIG. 5 shows the steps performed by one embodiment of the invention. Steps 510 through 560 represent a loop that is performed iteratively. In the second and subsequent iterations, interim bitmap segments generated in the previous iterations reside in memory area 404. The interim bitmap segments shall be explained in further detail below.

In step 510, bitmap segments are selected from bitmap streams 394 based on a range of row ids and stored as interim bitmap segments. Bitmap segments are selected until either there are no more bitmap segments to select or the input bitmap segments occupy an amount of memory greater or equal to the input allocation. An input bitmap segment may be joined with another input bitmap segment when the ranges of both do not overlap. Joining two bitmap segments reduces the amount of memory needed to store both of them.

In step 520, a determination is made of whether there are any more bitmap segments to select. If there are no more bitmap segments to select, then control passes to step 570. In step 570, input segments along with any interim output from the previous iterations are ORed together to form a resulting bitmap stored in buffer 460. Then control passes to step 580, which shall be explained in detail later.

If the determination in step 520 is that there are no more bitmap segments to select, then the memory occupied by the input bitmap segments must exceed the input allocation. Control then passes to step 530.

GENERATING INTERIM BITMAP SEGMENTS

In step 530, input bitmap segments and interim bitmap segments from the previous iteration are merged by ORing and compressing them into interim bitmap segments. As the interim bitmap segments and input segments are merged, the memory used to store them is freed.

The amount of compression achieved will vary. However, after step 530, the interim bitmap segments never occupy more memory than occupied by the input bitmap segments and interim bitmap segments from the previous iteration. The process of ORing the input bitmap segments and the interim bitmap segments of the previous generation creates an output represented as a new set of interim bitmap segments. This output contains the same number of bits as was in the sum of its input, the input bitmap segments and the interim input bitmap segments of the previous iteration. These bits can only be closer to each other in the output so they can not consume more space then the bits did when scattered around the inputs. In an embodiment of the invention, the compression scheme compresses away the gaps between the bits. Any scheme which compresses away the gaps will compress more efficiently when the bits are closer together. Thus, the compression ratio never falls below one.

Another reason the interim segments of an iteration may occupy a lessor amount of memory than the input bitmap segments and the interim bitmap segments from the previous iteration is that a lessor or equal number of interim bitmap segments are used to store the data from a larger or equal number of input bitmap segments and interim bitmap segments. When storing a bitmap segment, structural overhead is incurred for each bitmap segment. An example of structural overhead is the memory used to store data about the range associated with a bitmap segment. When a reduced number of bitmap segments is used to store data from a larger number of bitmap segments, the structural overhead required is reduced.

In step 540, a determination is made of whether the memory occupied by the interim bitmap segments exceeds a percent threshold of the memory limit. If memory occupied by the interim output exceeds a percent threshold of the memory limit, then control passes to step 550.

REDUCING THE RANGE

In step 550, the range of row ids is reduced. In the next iteration of selecting input bitmap segments, only the portions of the input bitmap segments corresponding to the reduced range are selected. In the following generation of interim bitmap segments or the resulting bitmap, portions of bitmap segments corresponding to row ids outside the new range in the input segments and interim bitmap segments from the previous iteration are ignored. In an input bitmap segment or an interim bitmap segment, a portion of the bitmap section contained may correspond to row ids within the reduced range, and a portion may correspond to row ids outside the reduced range. The portions of bitmaps corresponding to row ids outside the reduced range are truncated. Memory used to store the truncated portions is relinquished and rendered available for memory re-allotment in step 560.

ADJUSTING THE MEMORY LIMIT

In step 560, allocations of the memory limit are adjusted. First, the memory being used by the interim output just generated is allocated to the interim allocation. The remainder of the memory is allotted between the input allocation and the output allocation based on a ratio. Unless the compression ratio is 1, the ratio used to allot the memory limit is set lower than the compression ratio achieved so far as a measure of protection against deterioration of the compression ratio in the following iterations of generating interim bitmap segments.

GENERATING RESULTING BITMAPS

In step 570, the input bitmaps segments and the interim bitmap segments are merged to generate a resulting bitmap. In step 580, a determination is made of whether the resulting bitmap represents a merge including the last row id of the row ids associated with the bitmap segments in the bitmap streams. If the resulting bitmap represents a merge which includes the last row id of the row ids associated with the bitmap segments in the bitmap streams, then a merge status 474 indicating that the resulting bitmap represents a range including the last row id is transmitted. Performance of the steps ends.

If the determination made in step 580 is that the resulting bitmap represents a merge which does not include the last row id of the row ids associated with the bitmap streams, the next step is 590. In step 590, the range is shifted forward to a new range. The beginning of the new range is set to the next row id following the previous range. The length of the range is retained. This range size represents a range size very likely to avoid being reduced, thus avoiding the waste of computer resources incurred when merging portions of bitmap segments which are later discarded.

After the range is reduced merge status 474 is transmitted. When merge unit 450 receives another merge request 472 from requester 470, control passes to step 510 for generation of the next resulting bitmap.

ILLUSTRATION OF COMBINING BITMAP STREAMS WITHOUT REDUCING ADJUSTING THE RANGE

Figure 6:
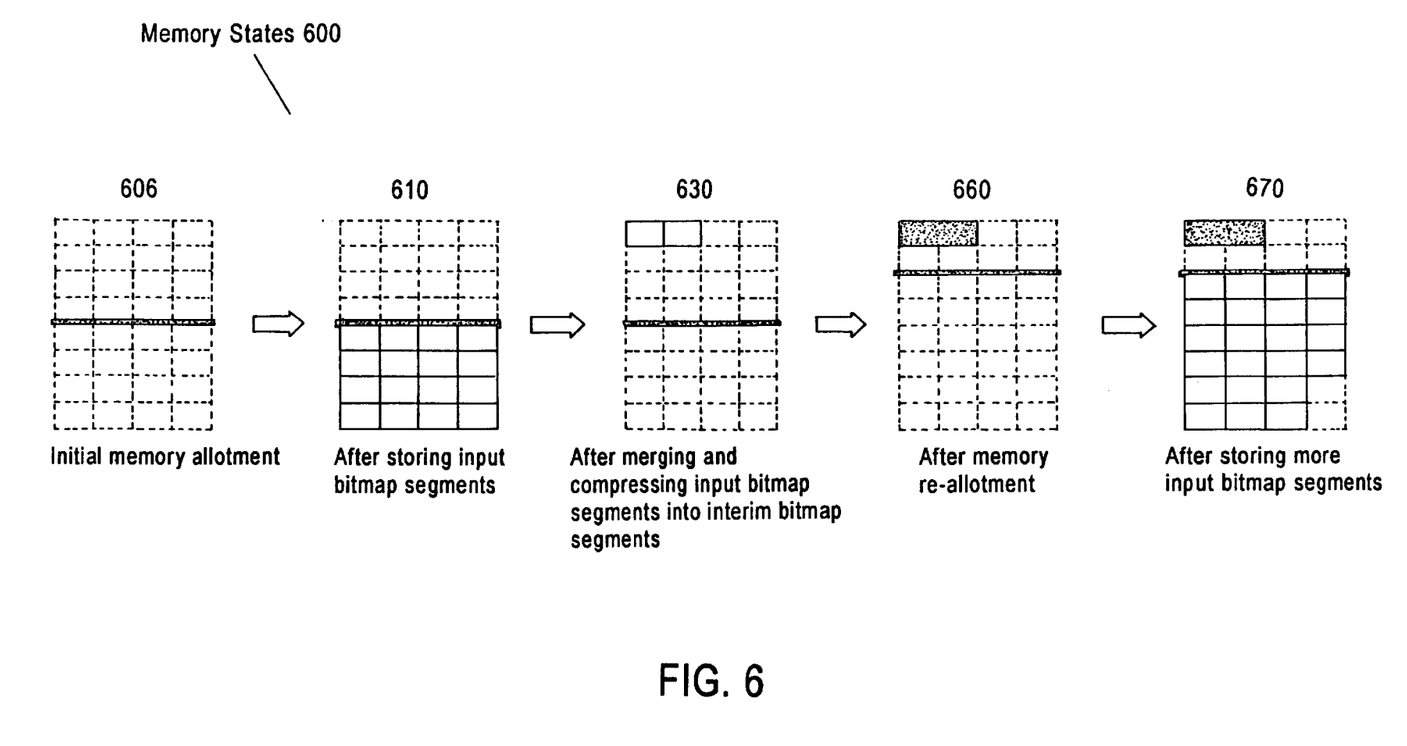
FIG. 6 shows memory states depicting memory usage in an illustration of the performance of the steps of an embodiment of the invention without reducing the range.

The operation of the steps in FIG. 5 in which the range is not adjusted is illustrated with reference to exemplary memory state 410 and memory states 600.

Exemplary memory state 410 depicts the memory usage of one embodiment of the invention at a given step in the operation of the steps in FIG. 5. The boundary of memory area 404 in exemplary memory state 410 is a boundary encompassing an area representative of an amount of memory. Area 420 is a darkened area representing an amount of memory allotted to the interim allocation. Area 430 is an area representing an amount of memory allotted to an output allocation. Area 4 40 is an area representing an amount of memory allotted to an input allocation. The area representing the output allocation is always above the area representing the input allocation.

Figure 7:
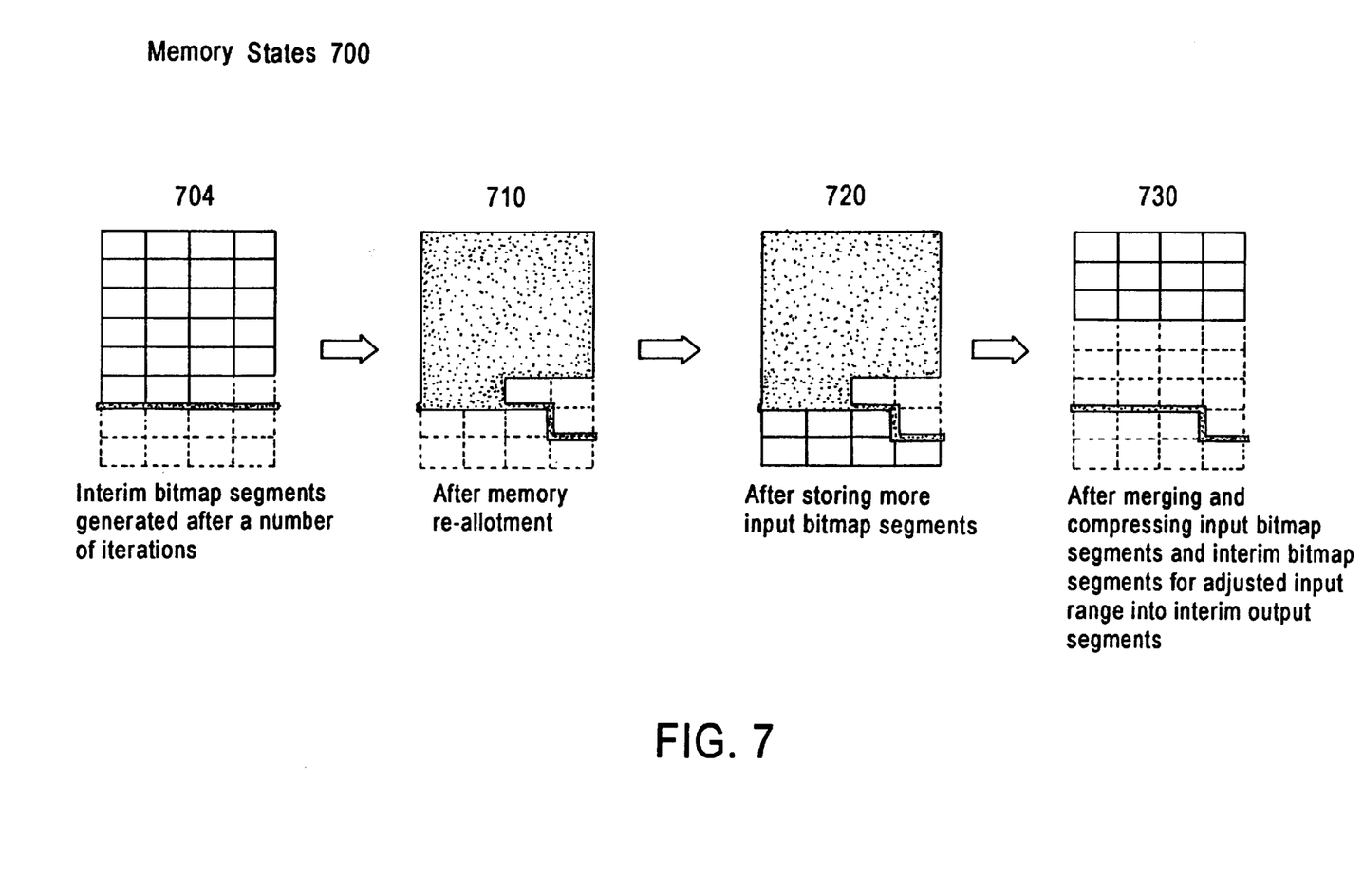
FIG. 7 shows memory states depicting memory usage in an illustration of the performance of the steps of an embodiment of the invention in which the range is reduced.

Blocks of memory 442 are blocks of memory used to store input bitmap segments. Blocks of memory 432 are blocks of memory used for storing interim bitmap segments. Memory states 600 and 700 depict memory usage in the same manner.

Memory states 600 shows memory usage at various steps in the operation of steps in the illustration in which the range is not reduced. Memory state 606 shows the initial memory allocations. The memory limit is divided evenly between the input allocation and the interim allocation.

In step 510, the range is initialized to 1 through infinity, a range which should encompass all row ids associated with the bitmap segments in the bitmap streams. Bitmap segments are selected based on the range and stored as input bitmap segments until the amount of memory used to store the input bitmap segments is reached. Memory state 610 shows the memory usage after the execution of the third step.

In step 520, the determination is that not all bitmap segments for the input range have been selected, so the next step is step 530.

In step 530, interim output segments are generated. Memory state 630 shows the memory usage after the execution of this step.

In step 540, it is determined that the percentage threshold of the memory limit used by the input bitmap segments has not been exceeded. Control then passes to step 560.

In step 560, the memory limit is re-allotted. The amount used by the interim bitmap segments is allotted to the interim allocation. The remainder of the memory limit is allotted between the input allocation and the output allocation at a ratio of 16 to 6 according to one embodiment of the invention. This ratio is less then compression ratio achieved so far, which was 8 to 1. Memory state 660 shows the memory usage and allocation after the execution of this step. Control then passes to step 510.

In step 510, bitmap segments are selected and stored as input bitmap segments until the all the bitmap segments have been selected. Memory state 670 shows the memory usage after the execution of this step. In step 520, the determination made was that all the bitmap segments have been selected, so control passes to step 570. In step 570 a resulting bitmap is generated. Control then passes to step 580.

In step 580, a determination is made that a resulting bitmap representing the last row id has been generated. A merge status is transmitted to indicate that a resulting bitmap representing the last row id has been generated. Performance of the steps ends.

ILLUSTRATION OF REDUCING RANGE

The operation of the steps in FIG. 7 in which the range is adjusted is illustrated with reference to exemplary memory states 700. Memory state 704 shows the state of the memory usage after step 530 after a number of iterations.

In step 540, it has been determined that interim bitmap segments exceed the percent memory threshold. Interim bitmap segments occupy over 68% of the memory limit. According to one embodiment of the invention, the percent memory threshold is 66%. Thus control then passes to step 550.

In step 550, according to one embodiment of the invention the range is reduced by one half. In step 560, the remainder of the memory limit is allotted between the input allocation and the output allocation at a ratio of 7 to 3 according to one embodiment of the invention. This ratio is less then compression ratio achieved so far, which was 8 to 1. Memory state 710 shows memory usage after execution of step 550.

In step 510, bitmap segments are selected and stored as input bitmap segments until the amount of memory used to store the input bitmap segments is reached. Memory state 720 shows the memory usage after the execution of the step 510.

In step 520, the determination is that not all bitmap segments for the input range have been selected, so the next step is step 530. In step 530, interim output segments are generated. The portions of input bitmap segments and interim bitmap segments representative of a range of row ids beyond the reduced range of row ids are discarded, thus freeing memory occupied by these portions. Memory state 730 shows the memory usage after the execution of this step. Comparison of memory state 730 with memory state 720 demonstrates the memory freed.

Steps 510 through 560 are repeated until a resulting bitmap is generated in step 570. In step 570, a resulting bitmap is generated. Control then passes to step 580. In step 580, the determination made is that the resulting bitmap does not represent a range of row ids including the last row id, so control passes to step 590.

In step 590, the range is shifted forward to a new range beginning at the row id beginning immediately after the end of the current range. The new range is of the same size as the former range. A merge status 474 is transmitted to indicate that the resulting bitmap does not represent a merge for a range including the last row id. When merge unit 450 receives another merge request 472, control then passes to step 510. The steps are repeated until a bitmap representing a range including the last row id is generated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for combining a plurality of bitmaps to generate a resulting bitmap, the method comprising the steps of:
   A) selecting a subset of said plurality of bitmaps;
   B) extracting from said subset of said plurality of bitmaps a set of bitmap segments, wherein
      said set of bitmap segments includes bitmap segments that cover a particular range of bit positions for each bitmap in said subset of said plurality of bitmaps;
   C) generating a plurality set of interim bitmap segments based on said set of bitmap segments;
   D) repeating steps A) through C) until either
      more than a threshold amount of memory is required to store all interim bitmap segments generated for said particular range of bit positions; or
      all of said lurality of bitmaps have been selected; and
   F) if more than said threshold amount of memory is required to store all interim bitmap segments generated for said particular range, then:
      reducing said particular range, and
      repeating steps A) through F).

2. The method of claim 1, wherein the step of generating a set of interim bitmap segments includes generating compressed interim bitmap segments.

3. The method of claim 2, further including the step determining an amount of memory available to store said set of bitmap segments based on what level of compression is achieved in generating said compressed interim bitmap segments.

4. The method of claim 1, wherein the step of generating a set of interim bitmap segments includes joining together at least two bitmap segments.

5. The method of claim 1, wherein the step of generating a set of interim bitmap segments includes generating interim bitmap segments representative of a MERGE between said set of bitmap segments.

6. The method of claim 1, wherein the step of extracting from said subset of said plurality of bitmaps includes extracting one or more bitmap segments corresponding to a range of row ids.

7. The method of claim 6, wherein the step of repeating steps A) through F) includes discarding, before performing steps A) though F), interim bitmap segments that do not cover said particular range.

8. A method for combining a plurality of bitmaps to generate a resulting bitmap, the method comprising the steps of:
   A) selecting a subset of said plurality of bitmaps;
   B) extracting one or more bitmap segments from said subset of said plurality of bitmaps until memory required to store said one or more bitmap segments would exceed a first amount of memory, wherein
      said one or more bitmap segments includes bitmap segments that cover a particular range of bit positions for each bitmap in said subset of said plurality of bitmaps;
   C) generating a set of compressed interim bitmap segments based on said one or more of bitmap segments; and
   D) until all of said plurality of bitmaps have been selected, adjusting said first amount of memory based on a level of compression achieved in generating said compressed interim bitmap segments, and repeating steps A) through D).

9. The method of claim 8, wherein the step of generating a set of compressed interim bitmap segments includes joining together at least two bitmap segments.

10. The method of claim 8, wherein the step of generating a set of compressed interim bitmap segments includes generating compressed interim bitmap segments representative of a MERGE between said set of compressed interim bitmap segments.

11. The method of claim 8, wherein the step of extracting includes extracting bitmaps segments that correspond to a range of row ids.

12. The method of claim 11, the method further including the step of if more than a threshold amount of memory is required to store all interim bitmap segments generated for said particular range, then:
   reducing said particular range, and
   repeating steps A) through D).

13. A computer-readable medium carrying one or more sequences of one or more instructions for combining a plurality of bitmaps to generate a resulting bitmap, the one or more sequences of one or more instructions including instructions which, when executed by one or more processors, cause the one or more processors to perform the steps of:
   A) selecting a subset of said plurality of bitmaps;
   B) extracting from said subset of said plurality of bitmaps a set of bitmap segments, wherein
      said set of bitmap segments includes bitmap segments that cover a particular range of bit positions for each bitmap in said subset of said plurality of bitmaps;
   C) generating a set of interim bitmap segments based on said set of bitmap segments;
   D) repeating steps A) through C) until either
      more than a threshold amount of memory is required to store all interim bitmap segments generated for said particular range of bit positions; or
      all of said plurality of bitmaps have been selected; and
   F) if more than said threshold amount of memory is required to store all interim bitmap segments generated for said particular range, then:
      reducing said particular range, and
      repeating steps A) through F).

14. The computer-readable medium of claim 13, wherein the step of generating a set of interim bitmap segments includes generating compressed interim bitmap segments.

15. The computer-readable medium of claim 13, further including sequences of instructions for performing the step of determining an amount of memory available to store said set of bitmap segments based on what level of compression achieved in generating said compressed interim bitmap segments.

16. The computer-readable medium of claim 13, wherein the step of generating a set of interim bitmap segments includes joining together at least two bitmap segments.

17. The computer-readable medium of claim 13, wherein the step of extracting from said subset of said plurality of bitmaps includes extracting one or more bitmap segments corresponding to a range of row ids.

18. The computer-readable medium of claim 13, wherein the step of generating a set of compressed interim bitmap segments includes joining together at least two bitmap segments.

19. A computer-readable medium carrying one or more sequences of one or more instructions for combining a plurality of bitmaps to generate a resulting bitmap, the one or more sequences of one or more instructions including instructions which, when executed by one or more processors, cause the one or more processors to perform the steps of:

A) selecting a subset of said plurality of bitmaps;

B) extracting one or more bitmap segments from said subset of said plurality of bitmaps until memory required to store said one or more bitmap segments would exceed a first amount of memory, wherein said one or more bitmap segments includes bitmap segments that cover a particular range of bit positions for each bitmap in said subset of said plurality of bitmaps;

C) generating a set of compressed interim bitmap segments based on said one or more of bitmap segments; and D) until all of said plurality of bitmaps have been selected, adjusting said first amount of memory based on a level of compression achieved in generating said compressed interim bitmap segments, and repeating steps A) through D).

20. The computer-readable medium of claim 19, wherein the step of extracting includes extracting bitmaps segments that correspond to a range of row ids.

21. The computer-readable medium of claim 20, the method further including the step of if more than a threshold amount of memory is required to store all interim bitmap segments generated for said particular range, then:

reducing said particular range, and repeating steps A) through D).

* * * * *